April 28, 1931.  G. G. FLOYD  1,802,643
ELECTRICAL METER READING SYSTEM
Filed May 4, 1925  4 Sheets-Sheet 1

Inventor
George G. Floyd,
by Wallace R. Lane.
Atty.

April 28, 1931.           G. G. FLOYD           1,802,643
ELECTRICAL METER READING SYSTEM
Filed May 4, 1925          4 Sheets-Sheet 3

Inventor
George G. Floyd,
by Wallace R. Lane.
Atty.

Patented Apr. 28, 1931

1,802,643

UNITED STATES PATENT OFFICE

GEORGE G. FLOYD, OF RIVERSIDE, ILLINOIS, ASSIGNOR OF ONE-HALF TO THE WAHL COMPANY, OF CHICAGO, ILLINOIS, A CORPORATION OF DELAWARE

ELECTRICAL METER-READING SYSTEM

Application filed May 4, 1925. Serial No. 27,936.

The present invention relates to the transfer of readings or indications of instruments at a distance.

Among the objects of the invention is the transmission of indications or readings of indicating or measuring instruments such as meters and the like at a distance without the necessity of any one going to the location of the instrument to be read; and to effect a control at a distance from the mechanism preferably connected with the instrument to be read or recorded to effect the taking and receiving or recording of the indications or readings of such instruments.

It also comprehends the making use of an existing service line, such as a telephone line, or the like, for the conveying of the indicative settings of the instruments, the line and the exchange at the receiving end of the line being used without change or modification and without effecting the normal operation of the line, the standard equipment being used to convey the desired effects, the latter being made by a simple connection of appropriate mechanism at both ends of the line, which when operated, as by the operator at the exchange end of the line, will produce, there and as desired, the reading and recording of the meter readings, at the exchange.

At the subscriber's end of the line may be connected, preferably with a shut circuit, mechanism associated with the meter, such as the dial shafts thereof with relatively movable electrical conductive elements capable of taking a relation for each indicative reading of the dial reading position, such that the mechanism is conditioned commensurate with or corresponding to the instrument indication or reading, such mechanism also being capable of being set into operation to perform a cycle of reading or indication transferred by the sending of an impulse or suitable current energy over the line from the operator at the exchange. In this way the transferring of the instrument instant settings is controlled wholly at a distance by the operator.

Either the current or energy thus supplied to the line or energy of a different characteristic, such as alternating current of a different cycle or frequency, or direct current, may be sent over the line to the mechanism so as to maintain, during the cycle of operation of the mechanism, a constant current in the line, the transferring mechanism and the receiving and recording mechanism, this current normally not affecting the recording mechanism, but acting as a medium such that when the transferring mechanism is stepping-off or serially sending increased energies of current or impulses proportionate to the indicative dial settings of the meters, the recording device, preferably having a suitable marking means, will operate accordingly to effect a marking of the impulses which will be, when interpreted, exactly commensurate with the measure indications or settings of the instruments or meters.

When the device is operated and in order that the subscriber may not operate the telephone and thus possibly effect the operation of the meter reading at the time when the operator is using the line for that purpose, the subscriber's line may be made temporarily open, and then automatically close again upon the cessation of the use of the line and of the meter reading mechanism. On the other hand, should the operator attempt to use a line for effecting a reading and the line be busy, a busy signal is effected and the line is not then used for meter reading.

A single subscriber's line may be used for the reading of more than one meter set, by a separate circuit connection with the line to each set, the initiating of the operation of each set being selectively controlled by a sending of an appropriate current, such as alternating current of given cycles or frequencies, similar to the selective ring of telephone bells.

At the exchange end of the line may be provided a unitary device comprising circuits and sources of electrical energy, as well as a recording and marking or similar means, which may be preferably portable, and from which the operator may plug-in for effecting connection with a standard telephone board and with the line to the meter reading mechanism. The plugging-in of this device conditions the line for transfer of the signals and together with controlling of the currents sent over the line, the operating of the mechanism at the meters is effected and in turn the latter conveys its effects over the line and through the circuits of the receiving and recording device to produce a record of the readings.

The invention also comprehends the idea of controlling mechanical power at a distance, this being effected in the particular embodiment disclosed, by the sending of energy over the line from the exchange to the control mechanism at the meter, which preferably releases sources of energy, such as spring motors for effecting a cycle of operation of such mechanism, and also including means automatically opening the control circuit at the end of the cycle of operation.

In the mechanism for transferring indications of the instant dial reading or setting, each dial shaft is preferably provided with an electrical contact member which moves or rotates as does the indicator of the dial. Each member has contacts of different lengths differing from each other by a unit of dial measure, and being serially or progressively of lengths corresponding to or commensurate with a reading of the respective dial, such that a long contact corresponds to a high reading or indication; a short contact corresponds to a low reading or indication. These contacts are preferably arranged according to the decimal system. Cooperating and capable of making a wiping engagement with these contacts, are a series of contacts, preferably carried on disks driven by the spring motor, so that the contact of a disk will engage and move over that contact of the length corresponding to the indication of such contact member so that a passage of electrical energy in increased amount may be effected through the mechanism and over the telephone line to the recording device at the exchange end of the line, whereby the marking means is thrown into operation for the length of time the contacts are in engagement, a long mark being made for a long contact and high indication or reading and a short mark for a short contact or low indication or reading. When the contact engagement has been completed for a dial setting, a succeeding disk and contact operates in conjunction with a succeeding dial contact for effecting a marking of the indication of that particular dial setting, and so forth for the series of the dials of a meter. Upon the completion of the reading of one meter, a similar operation is automatically effected for the reading of the other meters in succession until all the meters of the set have been read and recorded.

The invention also comprehends other objects, advantages and capabilities as will later appear and are inherently possessed by the invention.

Figure 1:
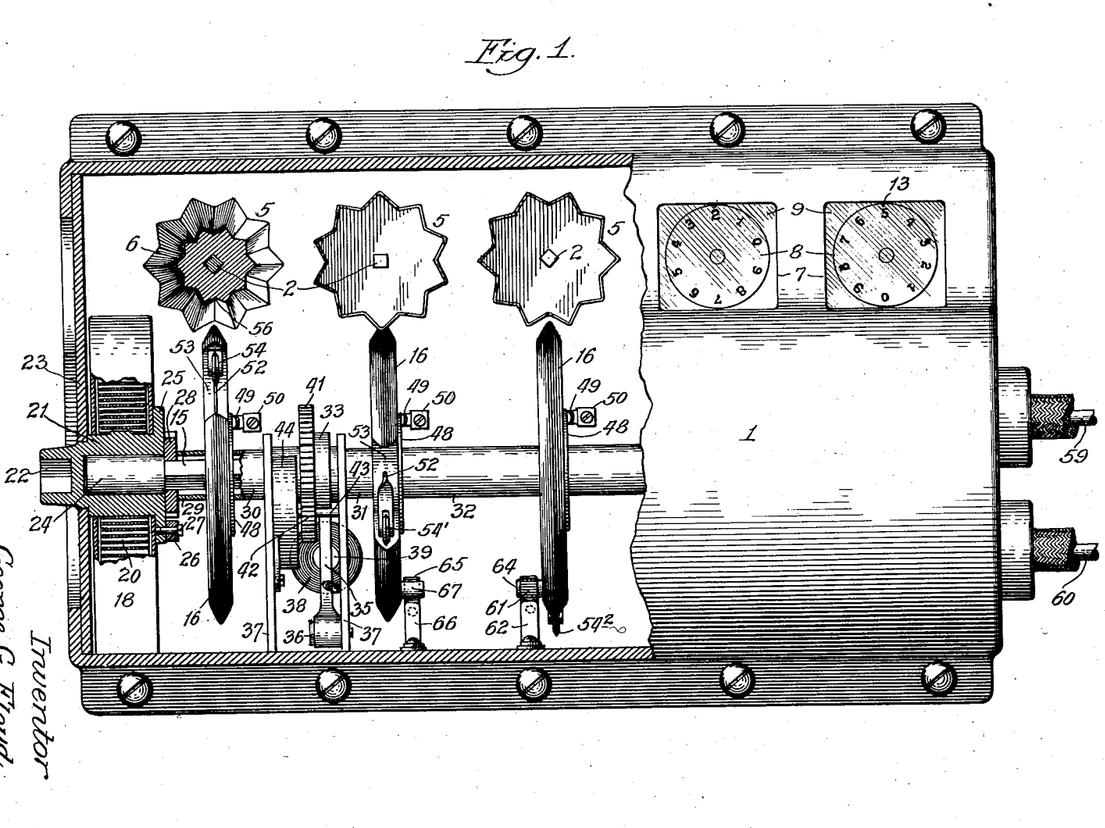
Figure 1 is a view partly in vertical section and partly in elevation of a mechanism associated with a meter for effecting transfer of indications.
Figure 2:
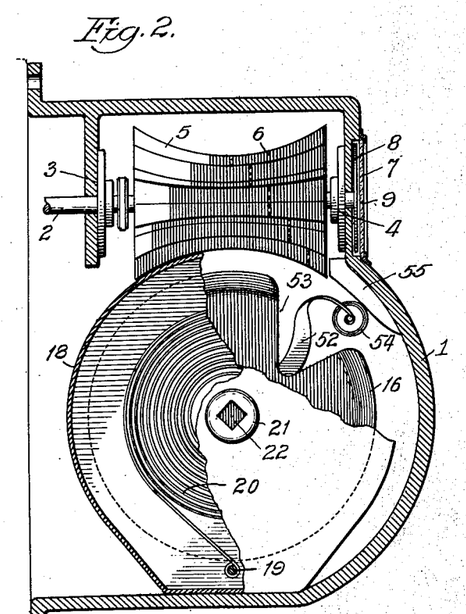
Figure 2 is a transverse sectional view of the same with parts broken away.

Referring now more particularly to the drawings, the embodiment chosen to illustrate the invention is shown as comprising a housing 1 capable of attachment in any suitable manner to a meter or similar indicating device and for including the mechanism for transferring the meter indications or settings. This mechanism is preferably associated with a meter either by attaching the same to an existing meter or by incorporating the same with a mechanism of the meter when manufacturing the meter. It has operative connection with the meter by way of the dial shafts 2 or by having such shafts capable of being connected to the dial shafts of the meter, such shafts having suitable bearings 3 and 4 mounted in the casing 1 and each shaft carries an insulating member 5 of generally spool shape and having inlaid or otherwise attached a series of metal pieces 6 arranged in stepped order for a purpose later more fully explained. The forward end of each shaft 2 may extend into a window space 7 and carry a dial plate 8 visible behind a transparent window 9. The spool member 5 is preferably longitudinally grooved and the contacts 6 are preferably formed from a piece of sheet metal or the like and either mounted or pressed into the spool 5 so as to be similarly grooved and ridged as clearly shown in Figures 1, 2, 3 and 5 of the drawings. The shaft 2 is preferably non-circular, such as square in cross-section, so as to positively rotate the spool members when the shafts 2 are rotated by the meter. It will be noted that the lengths of the contact sections of the spool member vary in relation to or corresponding to the decimal system of indication of the meter, that is, the shortest contact 10 corresponds to and represents a zero reading, the contact of next length, such as contact 11 corresponding to and represents a reading of one, and so forth throughout the series of the different lengths of the contacts to the longer contact 12 which corresponds to and represents a reading of nine; the reading of 10 returning to the contact 10 which is a reading of zero for that particular spool and owing to the gearing and stepping up of the meter dial shaft system, the next dial spool will have advanced to a unit or one position so that the full numbers will be operating in accordance with the usual method of reading the dials of a meter. The metal piece corresponding to an indication of the dial reading will be presented in its lowermost position for contact therewith of a contact member later explained. The dial plate 8 will have the numerals arranged thereon in diametrically opposite relation so that, referring to Figure 1, when the contacts for the reading 5 is in a lowermost position, the corresponding numeral on the dial plate will be in the uppermost position beneath the stationary index or pointer 13. It will be noted that there is a spool member for each dial shaft and as many spools in a casing as there are dials for indications to be made. Referring to Figure 1, the spool or dial member at the right hand end, as usual, will indicate the reading of the lower digit or ordinal of a figure, the next dial, the next digit, or what may correspond to the tens when regarding the first dial as corresponding to units, and the third dial as the hundreds, etc. Beneath these spool or dial members is longitudinally supported a shaft 15 to which is connected a series of disks 16 arranged in spaced relation and each beneath a spool member and cooperable therewith as later explained. The periphery of each disk corresponds to the curvature of a spool member or, in other words, the longitudinal curvature of the spool member is determined by the center of the circle of the disk, so that the spool member may be permitted to rotate about its own axis without interference by the disk 16 and yet when the disk 16 is caused to rotate, the periphery of the disk will be proximate to and concentric with the longitudinal curvature of the spool member. The shaft 15 is preferably non-circular in cross-section whereby the disks 16 may be positively driven thereby, one end of the shaft being connected to a spring motor of any suitable type, and supported at the other end thereof in a suitable bearing provided in the case or housing 1. The spring motor shown comprises a casing 18 either suitably anchored to the bottom of the housing 1 or resting therein and carrying an anchor pin 19 to which is connected one end of a spring 20, the other end of the spring being connected, in the usual manner, to a winding hub 21 having a winding or key socket 22 extending to the exterior through an end wall 23 in one end of the casing 1. The hub 21 is recessed to receive an enlarged and round end 24 of the shaft 15. This hub also has a flange 25 to which is secured a pawl 26 by means of a pin or screw 27, the pawl 26 normally operating against a ratchet 28 secured to the shaft 15. From this it will be apparent that when the hub 21 is operated by the winding key to wind the spring, the pawl 26 will slip the cogs of the ratchet wheel 28 without disturbing the shaft 15 and the parts connected thereto. On the other hand, when the spring 20 operates, its motive force is effected through the hub 21, pawl 26 and ratchet 28 to the shaft 15. The disks 16 and other parts carried by the shaft are held in suitably spaced relation by spacers 29, 30, 31 and 32, these spacers being preferably of tubular form.

At a suitable point of the shaft may be connected or secured a disk 33 having a notch 34 in the periphery thereof cooperating with a latch 35 pivotally connected to a pin 36 secured to a standard 37 suitably held in stationary position in the housing 1. The latch 35 acts as an armature of an electro-magnetic device 38 having a core 39 to attract the armature latch 35 when the electro-magnetic device is energized so as to withdraw the nose 40 of the latch from the notch 34 and thus release the shaft and spring motor so that the shaft may be rotated by the spring.

In order that the rotation of the shaft may be substantially uniform, the shaft has secured thereto a gear 41 in mesh with a pinion 42 secured to a shaft 43 suitably rotatably supported in the standard 37. The shaft 43 extends into a brake casing 44 and carries a brake mechanism having shoes 45 cooperating with the braking surface 46 of the mechanism 44 for effecting a drag in proportion with tendency to an increase or acceleration in speed so that the speed of the shaft 15 may be maintained uniform and constant. The shoes 45 are operated by centrifugal action so that as when there is a tendency to increase in speed there is an increase, proportionately, of braking action or drag upon the brake surface 46 and hence on the shaft 15. When there is a decrease in speed, the withdrawal of the shoes reduces the braking effect and permits the shaft speed to increase to the predetermined speed.

Figure 3:
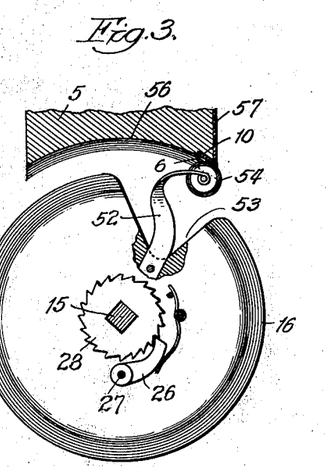
Figure 3 is a view of certain details of the same.
Figure 4:
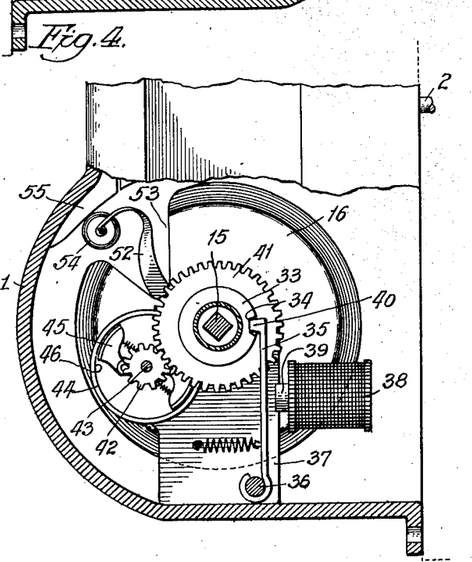
Figure 4 is a similar view of other details.
Figure 5:
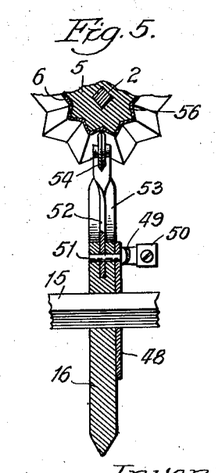
Figure 5 is a side view of other details.

Each disk 16 is preferably provided with a contact plate or ring 48 being normally in contact with or wiped by a stationary contact or brush 49 supported by a suitably insulated member 50 to which one of the electrical leads of the circuit may be connected. From each contact plate 48 and extending through the disk 16 is a connecting pin 51 or the like for performing the double function of securing a contact supporting member 52 in the disk 16 and for establishing electrical communication between the plate 48 and the member 52. The disk 16 is preferably of insulating material and provided with a sector cut notch 53 in which is located the member 52, the latter extending radially outwardly and being curved to form a spring or resilient member carrying at the free end thereof a contact member or roller 54, the spring 52 being curved in shape so that it may flex radially as well as axially of the shaft 15. The shaft and disks are so positioned that for the first disk of the series, namely that at the right hand end of the casing as shown in Figure 1 of the drawings, the contact roller 54 will normally repose, at rest, against an insulating and guiding member 55 suitably secured to the inside of the casing 1. When the shaft and disk are rotated in the direction of the arrows shown thereon in Figure 10 of the drawings, the roller contact 54 will pass from the member 55 and be caused to travel over and along a groove 56 of the spool member 5, and as shown in Figure 3, the roller 54 is beginning to move over a metal contact portion, such as metal contact 10 and will then continue to move along the remainder of the groove which is of insulating material until the roller has passed from the other end of the spool member 5. Each spool member 5 preferably is formed at one end thereof with a metal contact piece 57 integral with the contacts inlaid or forming part of the grooves 56 of each spool member. This is clearly shown in Figure 3 of the drawings. Against each plate or metal contact 56 at the end of each spool member, is provided a contact brush 58 (see Figure 10 of the drawings) suitably connected by leads to the circuits of the mechanism, as will later be more fully explained in connection with Figure 10. From the above it will be apparent that a circuit may be established from the contact brush 49 to the contact ring or plate 48, pin 51, spring member 52, contact roller 54, one of the contacts in the spool, contact plate 57, and brush 58 to the circuit of the mechanism. When the roller 54 leaves one of the contacts, such as contact 10, shown in Figure 3 of the drawings, and passes over the insulating material of groove 56, this circuit will then be broken. The length of time the circuit is maintained depends upon the length of the contact 10 and the travel of the roller 54 thereover. In Figure 3, the contact 10 corresponds to the zero reading and will therefore so indicate as will later be explained.

In Figure 1 of the drawings leads 59 and 60 are shown to conventionally indicate any of the current conductors leading into the casing 1 and the mechanism therein. Within the casing are also provided a pair of electrical contacts 61 and 62 which are normally separated but capable of being brought into mutual contact by a pin 64 carried by one of the disks 16 when the latter is rotated. Also a second pair of contacts 65 and 66 are provided to be closed by a pin 67 carried by one of the disks 16, this pin acting to close the contacts at the end of a revolution of the disks and the shaft, while the pin 64 performs the function of closing the contacts 61 and 62 at the beginning of revolution of the disks and the shaft, as will later more fully appear in connection with the description of Figure 10 of the drawings.

Figures 6, 7:
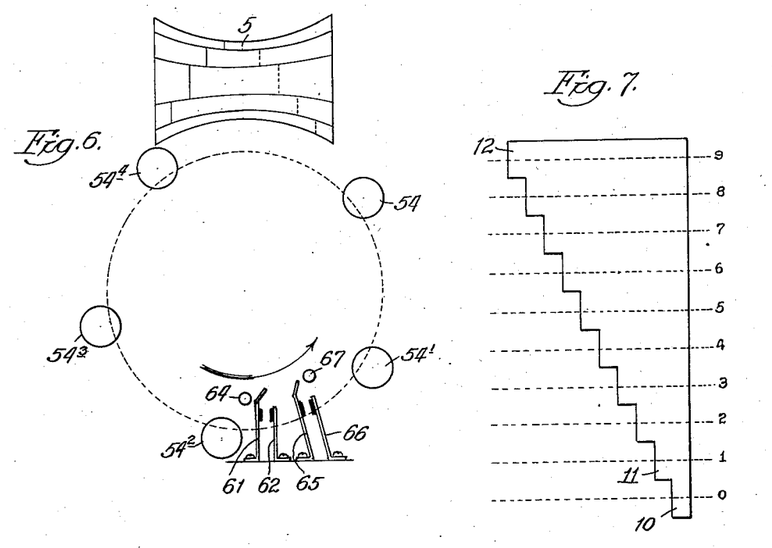
Figure 6 is a diagrammatic and conventional view of parts for illustrating the operation of the mechanism shown in Figures 1 to 5 inclusive.
Figure 7 is a conventional developed view of a series of metal contacts associated with a dial member.

Referring to Figure 7, this figure shows in a conventional or diagrammatic way the development of the contacts inlaid or attached to a spool member, it being understood that the sheet metal is wrapped about the spool and fitted into the grooved portions thereof. As previously stated, this metal piece comprises a series of contact members, each being of different length such that the member or portion 10 will effect a closing of a transfer circuit for the length of time that the contact roller 54 will pass over the member 10 to indicate a zero reading, the path of movement of such roller being indicated by the dotted line passing over this part 10; the same with respect to the member 11 which is of greater length for a unit of measure or indication so that it will effect a closing of the circuit for a period of time for the roller 54 to pass along the dotted line indicated over the member 11 and thus effect a transfer of a reading of "one" and similarly the succeeding portions will effect the transposition or transfer of readings for indications "two", "three", "four", "five", "six", "seven", "eight" and "nine", the contact 12 of the latter being of greatest length, and, owing to the wrapping of the piece about the spool member, will be located adjacent to the member 10. Should the reading be "ten" the indication will be zero on the first spool over the member 10 and on the second spool over the member 11. Figure 6 shows in a diagrammatic way the relation of the contact rollers 54 with respect to the various spools in one of the devices, the first disk 16, when the shaft and the disks are in normally non-operative position, will have the roller 54 in a position ready to pass over its respective spool member 5 and the second disk will have its contact roller 54' in trailing angular position such that the contact roller 54 must complete its wiping contact with its respective spool member before the contact roller 54' will arrive at a position to start contacting with its respective spool member. Likewise, contact rollers $54^2$, $54^3$ and $54^4$ will be in similar trailing positions for the succeeding disks to the last one thereof on the shaft 15 of that series. When the roller 54 has reached the position of rollers $54^4$, the other rollers, on their respective disks, shall have reached advanced positions, as for example roller 54' will then take the position of roller 54 and roller $54^2$ shall have advanced to the position of the contact roller 54', etc. In this figure it will also be noted that when the shaft begins to rotate the pin 64 will close the contacts 61 and 62 to effect the closing of a circuit portion which will be later explained, and that when the shaft has about completed its revolution the contact pin 67 will close the contacts 65 and 66 for another circuit portion also later explained.

Figure 10:
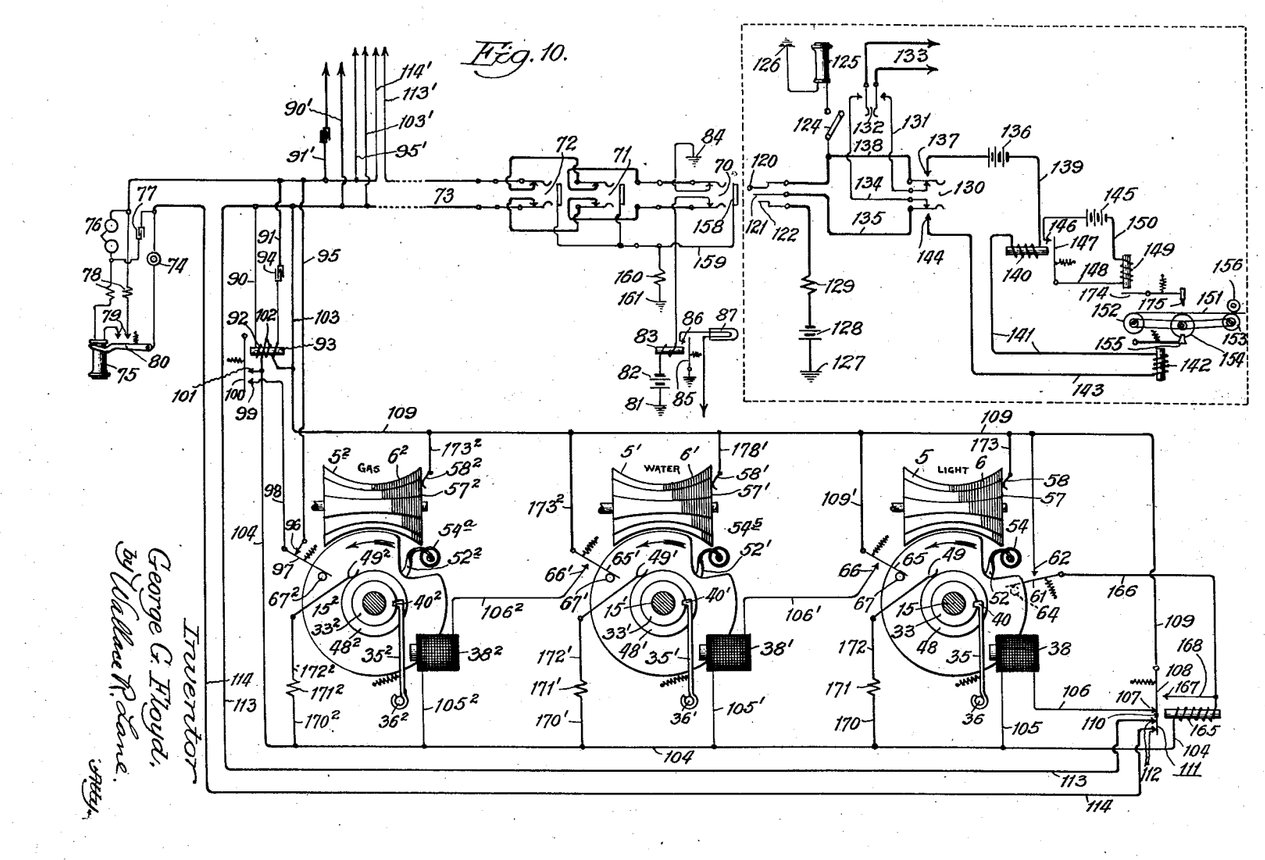
Figure 10 is a view of a wiring diagram of the circuits involved and the conventional inclusion of parts of the transferring mechanism.

Referring now more particularly to Figure 10 of the drawings, showing in a diagrammatic manner the wiring diagram and connections, the device is shown as connected to a subscriber's line of a telephone and apparatus capable of being operatively connected to the exchange end of the line. A telephone line, usually includes at the exchange end, an answering jack 70 which in turn is connected to other parts of the board, such as inter-subscribers or multiple jacks 71 and 72 and hence to the telephone line 73 to the subscriber's station comprising of a transmitter 74, a receiver 75, and a bell ringing mechanism 76 together with a condenser 77 for the bell ringing circuit and coils 78 for the talking circuit, the latter being closed by contacts 79 engaged by the hook 80 when the receiver is lifted. At the exchange end of the line are also usually connected a signal circuit leading from a ground 81 through a battery 82, electro-magnetic switch operating device 83 to the answering jack 70 and thence to the ground 84 such that when the subscriber makes a call over the line which incidentally energizes it, the current will pass through the electro-magnetic device 83 to draw the switch 85 in contact with contact 86 to close a circuit with the lamp or similar signal device 87, thus indicating to the operator the subscriber's call. When the operator plugs in for answering or listening the signal controlling circuit is opened by the spreading of the leaves of the jack, and by suitable operation the subscriber's connection may be made in the usual manner.

The present invention makes use of the line between a subscriber's station and the telephone exchange without in any way impairing such line and with practically no change therein. The mechanism at the meters is usually so connected that all the meters of a set may be read one after the other and the diagram shown in Figure 10 of the drawings, shows the arrangement for a "light", "water" and "gas" meter connected for such operation. This battery of devices may be operated by a single connection from the subscriber's line, such connection comprising a shunt circuit 90 and 91 including a coil 92 in a harmonic relay device 93 and a condenser 94. This circuit is for the purpose of transmitting alternating currents to the harmonic relay to effect the enclosing of a direct current circuit also connected in shunt with the subscriber's circuit or line. The direct current circuit comprises a wire 95 leading to a normally closed switch contact 96 switch member 97, wire 98 to relay contact 99, switch member 100, contact 101, holding coil 102 of the harmonic relay and returning by a wire 103 to the other side of the telephone line. This circuit, as traced, constitutes a direct current holding circuit for holding the switch member 100 in closed engagement with the contacts 99 and 101 after the alternating current, which initiates its closing, has ceased.

Assuming the harmonic relay to have been closed, the circuit may be traced from wire 95 through the harmonic switch 100, to wire 104, wire 105, electro-magnetic device 38, wire 106, switch contact 107 of the normally closed switch 108, and return wire 109 to the wire 103 connected to the other side of the telephone line. The switch 108 is made in two sections with an insulating piece or section 110 between the two sections of the switch, the outer section 111 normally bridging the contacts 112 of the circuit portions 113 and 114 forming a main part of one side of the main telephone line. At the receiving end of the station the invention comprehends the idea of providing a unitary and portable device bearing thereon all of the means necessary for receiving and recording the transmitted indication signals or settings. Such a device is shown diagrammatically within the dotted line rectangle in Figure 10 of the drawings, and comprises a plug having contacts 120, 121 and 122 capable of contacting with the elements of the jack 70 in the usual way. The contact 120 is in circuit with a listening device including a switch 124, a receiver 125, and ground 126 in the frame of the device and hence to the same ground 127 through battery 128, resistance 129 and contact 122. The contact 120 is also in circuit with a direct current key or jack 130 and thence by wire 131 to an alternating current key or jack 132 in an alternating current circuit 133, the other side of the jack or key 132 being connected by wire 134 to the other side of the key 133 and thence by wire 135 to the center contact 121.

This device also may include a controlling circuit with direct current proceeding from a battery 136 to contact 137 which, when engaged with one of the limbs of the key 130 will proceed over the wire 138 to the contact 120 and thence along the subscriber's line and to the wire 95. From the battery 136 leads, in the opposite direction, a wire 139 to a coil 140 of a receiving relay switch operating device, and thence by wire 141 to a coil 142 of a recording release relay device, and thence by wire 143 to contact 144, which when engaged with the other limb of the key 130, will connect with the wire 135 to the center tip 121 and over the telephone line of the subscriber to the wire 103 of the transmitting mechanism. Associated with the relay device 104 is a marking circuit proceeding from a battery 145 to contact 146, relay switch 147, wire 148, coil 149 of a marking relay device, and wire 150 returning to the battery 145.

The recording device may be of any suitable construction and for illustration the drawing shows one having a ribbon 151 travelling over rollers 152 and 153 and a feeding device 154 having a notch for releasably receiving a latch 155 forming an armature of the release relay device 142, the feeding means 154 cooperating with the rollers 153 and 156 to feed the ribbon from the device for clipping or otherwise detaching the recorded portion or section of the ribbon.

Assuming the operator about to effect a transposition or transfer of meter readings, the portable device will be brought to the exchange board and the subscriber's circuit tested to determine whether or not it be free or busy. Before making this test the operator will either place a ribbon 151 in place in a recording device or see that it is in proper position for operation. The test is then made by the operator closing the listening switch 124 and touching the tip 120 of the plug to the jack sleeve 158 of the answering jack 70. If a click is heard in the receiver 125, the line of that particular subscriber is busy and the operator will not attempt to take a reading at this time. If no click is heard, the line is free and the operator will then insert the plug into the answering jack 70. When this is done, the limbs of the jack 70 break the circuit of the signal light operating device so that the signal 87 is thrown out of operation. The lower contact 122 of the plug will close this circuit from the ground 127 to the battery 128 and resistance 129 through the jack sleeve 158 and wire 159 to resistance 160 and ground 161. This places this circuit at a higher potential than ground so that when any listening receiver be placed between the ground 84 and the jack sleeve, current will go through the receiver and give a busy test or signal to any other operator attempting to use the subscriber's line. On the other hand the subscriber cannot effect a call to the board because the light 87 is cut off.

The operator then closes the alternating current key 132 so as to feed the alternating current to the wires 131 and 134 to the key 130 and thence over the wires 138 and 135 through the tips 120 and 121 to the jack 70 and both sides of the line to the subscriber and thence through the alternating shunt circuit 90 and 91 to the coil 92 of the harmonic relay. This will immediately effect a closing of the switch 100 against the contacts 99 and 101.

The operator then closes or operates the direct current key 130 before the closing off of the alternating current, these keys usually being interconnected so that when the direct current is thrown into the circuit the alternating current will subsequently be cut off. Direct current will now pass from the battery 136 to contact 137, wire 138 to tip 120 and jack 70 to one side of the subscriber's line to wire 95, and from the other side of the battery 136 by way of wire 139, relay 140, wire 141, relay 142, wire 143, tip 144, wire 145, tip 121, the other side of the jack 70, and the other side of the subscriber's line to the wire 103. The electrical energy in the battery 136 is not sufficient at this time, by reason of certain resistances interposed in the transmitting mechanism, to effect a closing of the switch 147 but the current is of sufficient strength to operate the relay 142 so as to release the latch 155 from the recording mechanism, so that the feeding of the ribbon 151 is started immediately upon the sending of direct current over the subscriber's line to the transmitting mechanism.

The direct current will pass through a shunt to the holding coil 102 of the harmonic relay so as to hold the switch 100 in engagement with the contacts 99 and 101. The direct current thus passes by way of wire 95 to contact 96, switch 97, contact 99, switch 100, contact 101, to holding coil 102 and wire 103 to the line. The operating circuit is by way of the same conductors to contact 101 and thence to wire 104, to wire 105 and electro-magnetic device 38, wire 106, switch 108, and wire 109 returning by wire 103 to the other side of the subscriber's line. The energizing of the electro-magnetic device 38 withdraws the latch 35 from the notch 34 of the collar secured to the shaft 15. The spring motor immediately operates to rotate the shaft and the disks 16 carried thereby in the direction of the arrow appearing on such disk. The turning of the disks, particularly the disk carrying the pin 64, will carry the latter into engagement with the contact 61 to close contact with the contact 62 and hence close the circuit from the wire 104 through a cut-out relay device having a coil 165, and thence over wire 166 to the switch or contact member 61. This will immediately operate to draw the switch 108 from the contacts 107 and 112, and into contact with contact 167 so that the current will now proceed from wire 104 through coil 165, to wire 168, contact 167, switch 108, and wire 109 to return 103 to the subscriber's line. At the same time the insulated section 111 of the switch will open that part of the subscriber's circuit 113 and 114, between the transferring mechanism and the telephone of the subscriber so that if the subscriber attempts to make a call the line will be temporarily dead and he cannot impair the operation and reading of the mechanism. By the opening of the switch 108 the circuit to the electro-magnet 38 is opened so that the latch 35 will return against the periphery of the disk 33 ready to be locked into the notch 34 after the shaft and disks have made a complete revolution.

Further turning of the disk 16 will cause the contact or pin 64 to leave the switch member or contact 61 and contacts 61 and 62 will separate. As the disks 16 proceed, the first disk, carrying the contact roller 54 will bring the same into contact with one of the contacts 6 of a spool member 5, which happens to be presented lowermost, and as the roller 54 rides over such contact, such as the contact 10, will close the circuit from the wire 104 through wire 170, through a low resistance coil 171, wire 172, to brush 49, to disk or ring 48, thence through the spring 52 to contact roller 54, contact 10 (or any other of the contacts presented to the roller), thence to end plate or contact 57, through brush 58 and wire 173 to the return wire 109 and 103 to the subscriber's line. Inasmuch as the resistance of coil 171 is lower than that of coil 165, the energy fed to the line from the battery 136 will be greatly increased so that the coil 140 of the receiving relay, will now be strong enough to attract the switch 147 and close the circuit to the marking device 149. This device will attract the marking armature 174 and cause a marker 175 to press against the ribbon 151. The duration or time interval of marking will be governed by the length of time the contact roller 54 travels over a contact 6 of the spool member. Should the reading be a high number, such as "eight", the contact member 6 corresponding to the reading eight, will cause the roller 54 to travel a greater distance and the stronger current will be in operation a longer while and thus hold the marker 175 in contact with the ribbon to make a longer mark. These marks will be in length proportional to the readings or indications of the meter and also corresponding to the length of the particular contact 6 presented to the roller 54. As the roller 54 leaves its respective spool member, the second disk will present the roller 54' to its respective spool and likewise send a current of greater energy over the line to again operate the marker to produce another line commensurate therewith. Likewise the succeeding rollers will operate for each spool member until each dial setting has been transferred and marked upon the ribbon. As soon as the reading of a meter is completed, the disks 16 together with its shaft shall have made a complete revolution and returned to a position where the latch 35 may engage with the notch 34 and stop the further turning of the shaft and motor. Just before a completion of a revolution by the disks, the pin 67 will cause an engagement of the contacts 65 and 66 so that the circuit may be closed from the wire 104 by way of wire 105', electro-magnet 38' and wire 106' to the contacts 66 and 65 and wire 109' to the return wire 109. These contacts 65 and 66 are held in engagement sufficiently long for the electro-magnet 38' to draw the latch 35' from the notch in the disk of the shaft of the next meter, such as the water meter. As the pin 67 passes over and leaves the contact 65, the latter will separate from the contact 66 and the circuit to the electro-magnet 38' will then be opened so that the latch 35' will not be held out of position when the shaft and disks have made a complete revolution, in this way preventing the continual operation of the device. The cut-out relay has the same function such that when the switch member 108 has been moved from the contact 107 the circuit of the relay 38 is opened so that when the disks and shaft 15 have made a complete revolution, the latch 35 will be in condition to stop further turning, otherwise the shaft and disks would continue to rotate without stop.

The reading of the water meter will now be effected similarly to the reading of the light meter, the roller 54' being caused to ride over a contact 6' and thus closing a circuit from the wire 104 through wire 170', resistance coil 171', wire 172', brush 49', contact ring 32', spring 52', roller 54', contact 61' engaged by such roller, end plate 57', brush 58', and wire 178' to the return wire 109. The series of rollers 54' will operate against their respective spool members in succession to give readings over the telephone line to the recording device and cause a marking of marks thereon in proportion to the settings or readings.

As the disks on the shaft and carrying the contacts 67' have nearly completed a revolution, the contacts 67' will cause an engagement of contacts 65' and 66' to close the electro-magnetic circuit from wire 104 through wire $105^2$, electro-magnet $38^2$, wire $106^2$, contacts 66' and 65', and wire $173^2$ to the return wire 109, the time of engagement of these contacts being sufficient for causing the electro-magnet to withdraw the latch $35^2$ from the notch in the disk $32^2$ so as to permit the motor of the gas meter to drive the shaft and disks thereon. The contact 67' then passes from the contact 65' so as to permit the disengagement of the contacts 65' and 66'. The rotation of the disks will cause the rollers $54^2$ to pass over the respective contacts $6^2$ in succession for all of the spool members, as in the other meters, and thus close the circuit from the wire 104 to the wire $170^2$, resistance $171^2$, wire $172^2$, brush $49^2$, contact ring $48^2$, spring $52^2$, contact roller $54^2$, a contact $6^2$, in engagement with such roller, end plate $57^2$, brush $58^2$, and wire $173^2$ to the return line 109. When the shaft and disks have nearly made a complete revolution and prior to the relatching of the latch $35^2$ in the notch of the disk or collar $33^2$, the pin $67^2$ will engage with the switch member 97 to open engagement from the contact 96 and therefore break the main direct current circuit from the line, thus deenergizing the whole transferring mechanism. This will deenergize the coil 102 of the harmonic relay and thus permit the switch 100 to open and at the same time the cut-out relay coil 169 becomes de-energized and the switch 108 with the switch section 111 drop into closing contact with the line sections 113 and 114 for re-establishing the circuit closing to the subscriber's telephone.

While the above has been described in connection with the meters of a subscriber who has a telephone line running to the place of use of his meters, it may occur that a neighbor does not have a telephone connection and in the event of desiring to secure a reading of his meters over the telephone line, the line to the subscriber, above mentioned, may have a branch connection to the neighboring meters for operation over the same subscriber's line. Such branch connections comprise circuit connections 91', 90', 95', 103', 113' and 114' which correspond respectively to the connections 91, 90, 95, 103, 113 and 114 of the mechanism connected to the subscriber's line. Any number of these branches may be employed as desired from a single telephone line.

When the completion of the reading and recording is effected, the operator merely withdraws the plug which comprises the contacts 120, 121 and 122 and thus re-establishes the telephone circuit as before.

Figure 8:
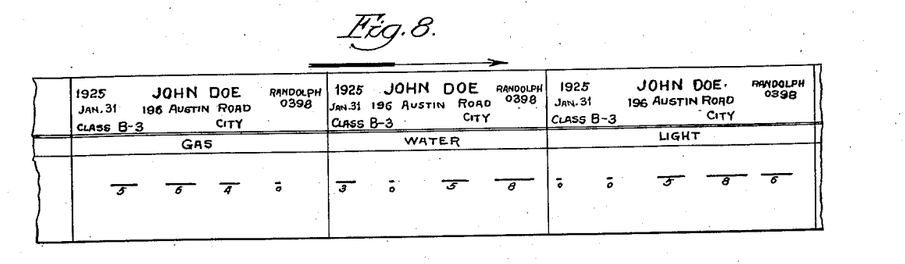
Figure 8 is a conventional view of a chart bearing a record received at the receiving and recording end of the line.
Figure 9:
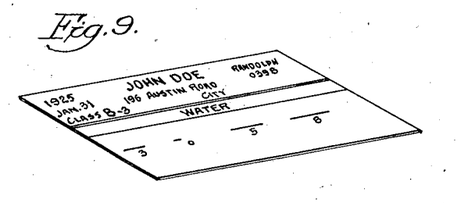
Figure 9 is a perspective view of a chart section pertaining to the record of a single meter.

Referring to Figure 8 illustrating a portion of a record ribbon, the ribbon is provided in sections with areas pertaining to the light, water and gas meters, or such other meters as might be used. These sections are divided into three parts each having identifying data as to the subscriber or the user of the meters, together with address, if desired, and the telephone number, the latter being a check on the data. The marks appearing on the ribbon are proportional to the reading or indication of the meter. The device is so designed that a mark will be made for a zero reading so that using the length of a contact 10 and a corresponding mark thereby on the chart, as a unit, it will be noted that a reading for "one" will be two units in length, and each reading increasing in proportion so that a reading for "nine" will be ten units in length. When the chart has been fed from the device with the record thereon the operator merely has to clip or cut the ribbon portion into three sections and send or mail the respective sections to the light, water and gas meter companies, or the companies rendering the respective services. Such a clipped section is shown in perspective in Figure 9. At the service companies office, the length of the lines are measured and a reading interpreted therefrom. Interpolation may be made such that when a line is three units in length it may be read as two and if eight units in length, will be read as seven, or this may be disregarded so that when the second reading is taken at the succeeding month, without making this interpolation, the difference in the readings will be exactly the same as if the interpolations were made at both instances.

The invention was conceived with the idea that these readings might be made at the telephone exchange without the necessity of sending any readers to the respective users for reading the meters as at present. During the early hours of the morning, usually between two and five o'clock, the telephone load on the telephone exchange is extremely light, and the reading of the meters over the telephone wires may be made during this time. It has been found by experiment that many more meters can be read within a period of two or three hours in a telephone exchange than can be read by readers sent to respective service users during a whole day, and when we take into account the fact that usually three readers are required for each house or service location as compared to the number of readings that may be taken by one operator in a few hours' time, a great saving in time and cost is effected. Moreover, the interposition of a human element with the great possibility of making mistakes in readings, is eliminated since the readings are taken wholly mechanically and electrically and accurately. The chance for a mistake is avoided.

While the embodiment herein described refers to the spools or contact elements as dial identifying or indicating members, it will be understood that the invention comprehends the use of such elements, in additional number to those employed for the dials of a meter or the like, for identifying the particular meter being recorded or for identifying the station group, such as the transmitting of predetermined impulses to effect given lengths of marks on the record chart in correspondence with the particular meter being read or recorded, or the transmission of the telephone number of the subscriber whose meters are being read, or the same with an auxiliary mark or signal for indicating the particular group of meters being read when more than one group are connected to a single subscriber's line. In the case of the identifying of the particular meter being read, a spool member like those used for the dials may be used together with a rotatable disk brush member, to first transmit an impulse or electrical energy in accordance with the length of the metal contact on that spool, or the transmission of one or more short impulses if there be one or more short metal contact pieces in the spool. As for example, for the light meter, the identifying spool may be set with one short metal contact to be wiped by the brush of the respective contacting disk, to transmit a short mark on the chart for indicating that the light meter is to be recorded, and then the succeeding marks will be those of the other spools corresponding to the dial readings. The meter identifying contact element or spool may be set for non-rotation, being only rotatable for changing the identifying position when placed in another meter. The identifying spool for the water meter may have a longer identifying metal contact or two short metal pieces in line, so as to effect, on the chart, a long mark of two units length or two short marks, thus indicating the starting of the recording of the water meter. Likewise, the spool of the gas meter may have a metal contact of three units length or three short metal contacts in line, to effect a similar identification. If there be more than one group of meters on a single subscriber's line the additional meters may have other lengths of metal contacts or other members of short metal contacts in line, such as contacts corresponding to four units or four short contacts for the light meter, five for the water meter, and six for the gas meter, and so forth for the meters of further groups on the same line.

For identification by telephone number, like spools may be used with wiping brush disks, the spools being set with the contacts of lengths to correspond to the numerals of the telephone or subscriber's number. The call letters of the exchange need not be transmitted but may be printed on the chart since all subscribers of an exchange would have the same call letters. The stepping off of the numerals of the call number would be effected the same as for the readings of the dials and marked preferably on the chart, as the first reading, then its identifying marking, and then the meter dial readings. If call numbers have suffix letters, and inasmuch as only four such letters are usually used for the parties on a line, a spool for indications of one, two, three and four may be used with the numeral spools to complete the station or telephone number identification.

In this way all possible human error is avoided, the readings and identifying being done automatically and electromechanically with accuracy.

While I have herein described and upon the drawings illustrated a preferred embodiment of the invention, it is to be understood that other details, arrangements of parts and constructions are comprehended by the invention without departing from the spirit thereof.

Having thus disclosed my invention, I claim:

1. A device for effecting indications of a measuring instrument at a distance, comprising rotary elements operated by the instrument commensurate with the measure indication of the instrument, each element having a series of contacts differing in lengths by a unit indication of measure, a driven device having movable contacts each capable of moving over a contact of an element of a length representing the measure indicating position of said element contact, electrical means located at a distance and operative to set the driven device in operation and to receive the measure indications of the instrument by electrical energy passing through said contacts when in engagement with each other.

2. A metering mechanism, comprising rotary members operated by the dial shafts of a meter and having axially disposed metal members of lengths proportionate to the dial indications pertaining thereto, and a rotary member having electrical contacts each of which is capable of traveling over any one of the metal contacts presented in position corresponding to an indicating position, whereby the length of the metal contact engaged by the electric contact will indicate the meter reading for that member carrying the metal contacts, and electrical means for receiving such indications.

3. A metering mechanism, comprising a rotary member operated by a dial shaft of a meter and being axially curved, metal pieces carried thereby and arranged with serially different axial lengths proportionate to the decimal indications of a dial, an independently rotated element having a curved surface reciprocal to the curved portion of said member and carrying a contact capable of traveling along that contact of said member presented in a position corresponding to a dial indicating position, and means for effecting an indication commensurate with the length of the engagement of the contacts.

4. A meter indication transmitting device comprising a series of rotary members driven by the dial shafts of a meter, a series of metal contacts arranged around each of said members and varying in length in correspondence to the measure indices of the respective dial, a motor driven shaft having disks respectively cooperating with said members, and each carrying a contact capable of wiping contact with that contact of a member presented in indicating position, and means for setting the disks in operation for transmitting the indicative settings of the members.

5. A meter indication transmitting device comprising a series of rotary members driven by the dial shafts of a meter, a series of metal contacts arranged around each of said members and varying in length in correspondence to the measure indices of the respective dial, a motor driven shaft having disks respectively cooperating with said members, and each carrying a contact capable of wiping contact with that contact of a member presented in indicating position, the contacts on said disks being arranged serially in angular trailing order whereby the contact of a succeeding disk will wipe contact with its respective member in succeeding time relation with the contact wiping of the preceding disk and member, and means for setting the disks in operation for transmitting the indicative settings of the members.

6. A metering mechanism comprising a series of spool shaped dial members connected to the dial shafts of a meter, a transverse shaft capable of being driven by a spring motor and carrying spaced disks the periphery of each of which cooperate axially with the curved portions of the spool members and carrying a contact adapted to move axially over the surface of the spool member, each spool member having contacts of progressive lengths corresponding to the decimal units of the measure indications of the meter, whereby to effect an indication of the measure setting when a contact of the spool member is presented in indicating relation with respect to the respective disks and the contacts are engaged, and means for setting the disks in operation and conveying the measure setting of the spool members.

7. A device for transferring setting indications of indicating instruments, comprising an electrical circuit connected to a service ine, circuit closing means for effecting transfer of electrical energies commensurate to the setting indications of the instruments, a harmonic relay connected to said service line and operated by alternating current in the service line to close a circuit by said current and maintain said circuit closed with direct current from said service line to said circuit closing means, and a cut-out relay in said electrical circuit operative to open said circuit upon cessation of operation of the transferring of the setting indications.

8. A device for transferring setting indications of indicating instruments, comprising relatively movable electric contacts having a relation for each indication of the instruments, movable contact elements, each being adapted to move over a relatively movable contact, means for operating said movable contact elements, electrical means connected to a service line and to said operating means and including electromagnetic release means for normally holding the operating means against operation and releasing the operating means upon the sending of a current through the service line and the electrical means.

9. A device for transferring setting indications of indicating instruments, comprising relatively movable electric contacts having a relation for each indication of the instruments, movable contact elements, each being adapted to move over a relatively movable contact, means for operating said movable contact elements, electrical means connected to a service line and to said operating means and including electromagnetic release means for normally holding the operating means against operation and releasing the operating means upon the sending of a current through the service line and the electrical means, and means associated with said operating means for opening the circuit of the electrical means at the end of a cycle of operation of the operating means.

10. A device for transferring indications of a series of meters, comprising means associated with each of the meters for indicating the instant setting thereof, a control circuit connected to said means and to a service line, a receiving device at the other end of the service line and comprising means for sending current of given characteristic over the line and said circuit for initiating the operation of the associated means, means associated with each of said meters whereby the associated means of the respective meters are automatically and successively operated to send the indications thereof over the service line in serial order, and means for receiving and recording the meter indications over said line commensurate with the setting of the meters.

11. A device for receiving and indicating meter readings, comprising electrical circuits and sources of electrical energy connected to an end of a service line, means at the other end of the line for indicating the instant setting of the meter, means for sending electrical energies over said line for effecting the operation of said indicating means, means for recording the indications sent over the line from the indicating means, said electrical circuits including a high resistance circuit operative to effect operation of the recording device simultaneously with the effecting of the operation of the indicating means, and a circuit controlled by said high resistance circuit for effecting the recording of indications commensurate with the indications sent over the line by the indicating means.

12. A device for receiving and indicating meter readings, comprising a jack plug adapted for connecting to a jack of a telephone line, a key controlled alternating current circuit for sending an alternating current over the line, a key controlled direct current circuit connected to said plug for sending direct current over the line, said keys cooperating to open the alternating current circuit after closing the direct current circuit, a resistance in said direct current circuit controlled by said circuit to initiate the operation of a recording device, a marking circuit controlled by said direct current circuit, the resistance in said direct current circuit being high to normally prevent the operation of the marking circuit but operative when receiving increased energy impulses from the line to cause the marking circuit to operate.

In witness whereof, I hereunto subscribe my name to this specification.

GEORGE G. FLOYD.